Inventor
Cyril C. Schnur
by H. J. S. Dennison
Atty

Feb. 2, 1926. 1,571,607
C. C. SCHNUR
METHOD OF AND APPARATUS FOR THE MANUFACTURE OF HOLLOW WARE FROM
REFRACTORY MINERAL SUBSTANCES
Filed May 16, 1923  3 Sheets-Sheet 2
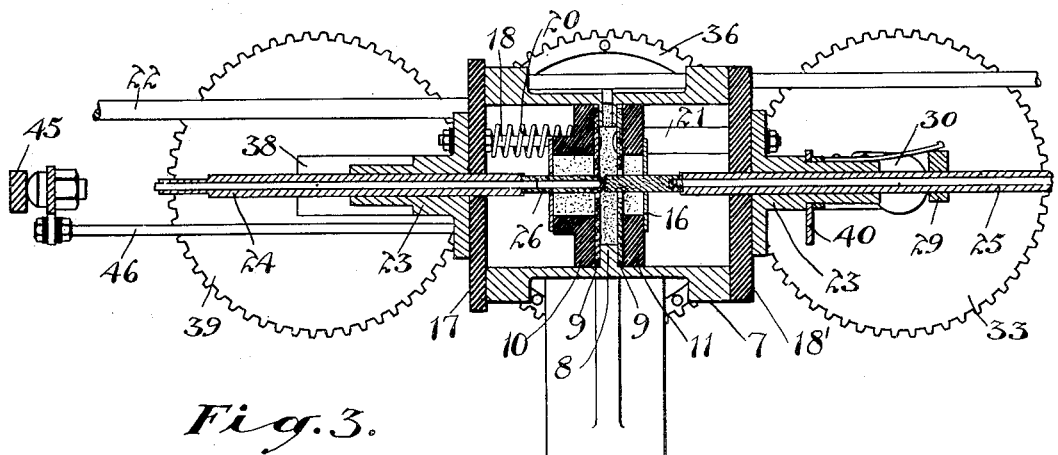
Fig.3.
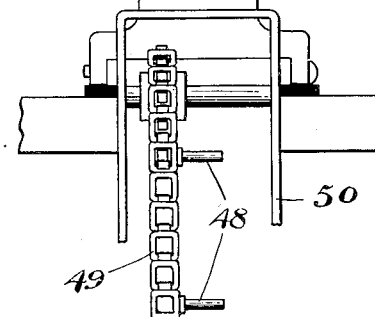
Fig.4.
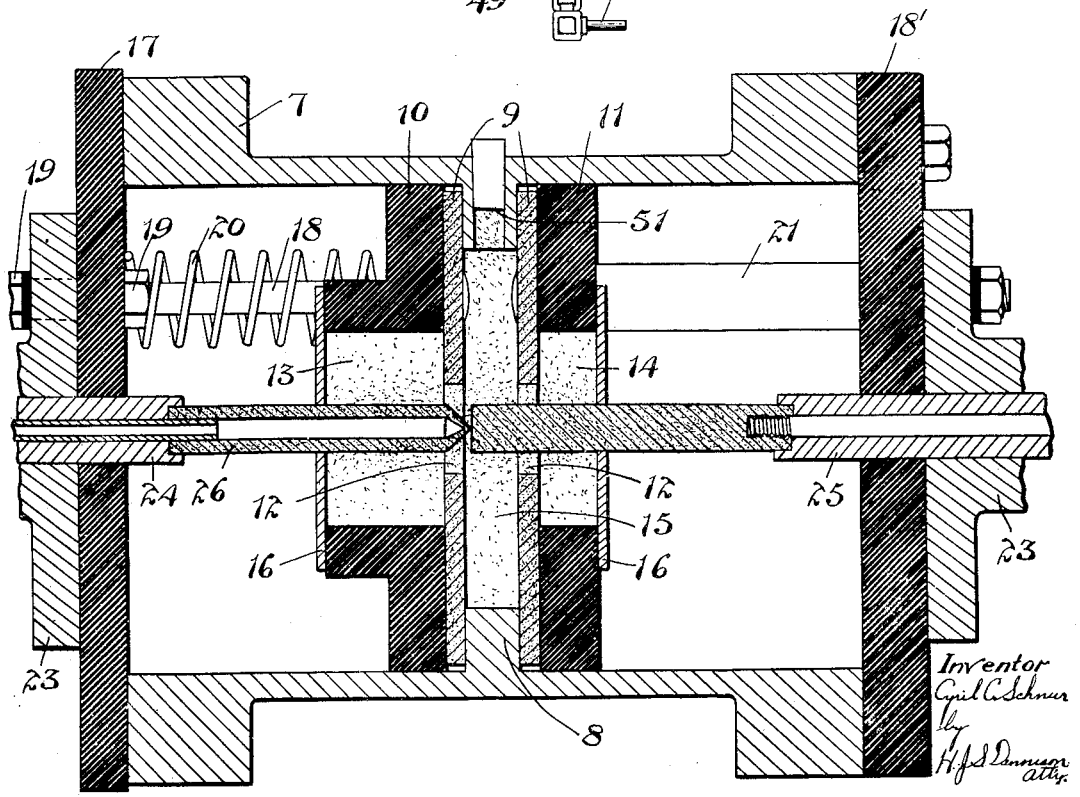
Inventor
Cyril C. Schnur Feb. 2, 1926. 1,571,607
C. C. SCHNUR
METHOD OF AND APPARATUS FOR THE MANUFACTURE OF HOLLOW WARE FROM
REFRACTORY MINERAL SUBSTANCES
Filed May 16, 1923   3 Sheets-Sheet 3

Inventor
Cyril C. Schnur
by H. J. S. Dennison
Atty.

Patented Feb. 2, 1926.

1,571,607

UNITED STATES PATENT OFFICE.

CYRIL C. SCHNUR, OF TORONTO, ONTARIO, CANADA.

METHOD OF AND APPARATUS FOR THE MANUFACTURE OF HOLLOW WARE FROM REFRACTORY MINERAL SUBSTANCES.

Application filed May 16, 1923. Serial No. 639,436.

*To all whom it may concern:*

Be it known that I, CYRIL C. SCHNUR, a subject of the King of Great Britain, and resident of the city of Toronto, county of York, Province of Ontario, in the Dominion of Canada, have invented certain new and useful Improvements in Methods of and Apparatus for the Manufacture of Hollow Ware from Refractory Mineral Substances, as described in the following specification and illustrated in the accompanying drawings, that form part of the same.

The principal objects of the invention are to enable the production of tubular structures from silica sand or like materials at moderate cost and to devise an apparatus which will produce such goods in quantity with the minimum labor and expense, and which will produce a product of uniform quality and dimensions.

The principal features of the invention consist in the novel method of fusing the refractory material by the use of the electric arc whereby the gases generated in fusion are conducted from the forming chamber through a hollow electrode; in the novel construction and arrangement of the apparatus whereby the refractory material is fused and then drawn in tubular form automatically.

In the accompanying drawings Figure 1 is an elevational view of a mechanical structure for carrying this invention into effect.

Figure 3 is a longitudinal sectional view of the apparatus shown in a horizontal position.

Figure 4 is an enlarged longitudinal sectional view of the fusing chamber and the electrodes.

Figure 2:
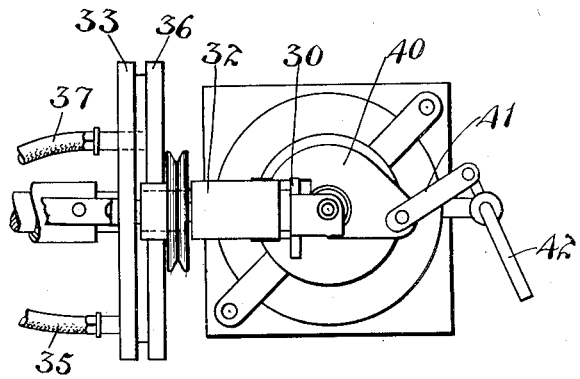
Figure 2 is an end elevation of a portion of the structure illustrated in Figure 1.

Tubes of silica or like refractory material are very greatly desired in connection with various forms of electrical apparatus but the production of such tubes has up to the present been very expensive. Further, the methods of production of such tubes have been such that tubes of uniform diameters and thickness are very difficult to obtain and are extremely expensive.

According to the present invention the silica sand is enclosed in a fusing chamber into which the ends of oppositely arranged electrodes are inserted. One or both of these electrodes are of hollew construction to provide a vent for the escape of gases produced in the fusing. The electrodes are charged with an electric current to produce an arc of the desired heat to fuse the silica and the electrodes are then drawn apart, each into a chamber adjacent to the main fusing chamber. This action forms a tubular member with enlarged globular ends which form the means for mechanically holding them and the holding means are then separated to draw the molten material into tubular form.

In the apparatus herein illustrated a bracket 1 hinged upon a rigid support 2 is provided with a bearing 3 in which a shaft 4 is journalled. Upon one end of the shaft is secured a worm wheel 5 adapted to mesh with a worm 6 driven at the desired speed.

Upon the other end of the shaft a cylinder 7 is rigidly mounted. This cylinder is formed with an annular flange 8 projetcing inwardly centrally of its length. At either side of the flange 8 are arranged the graphite discs 9 which are secured to the ring shaped insulating members 10 and 11. The discs 9 are formed with centrallly arranged holes 12. The members 10 and 11 are formed with internal diameters greater than the holes 12 and form the chambers 13 and 14 communicating with the central chamber 15 between the carbon discs. Plates 16 close the outer ends of the insulating rings 10 and 11.

Insulating plates 17 and 18' close the outer ends of the cylinder, the plate 17 being connected with one of the discs 9 by the rods 18, said rods being fixed to the plate 17 by nuts 19 on either side and said disc 9 being held to the headed inner ends of the rods by the coil springs 20. The other disc 9 is rigidly connected to the plate 18 by spacer bolts 21.

A pair of parallel guide rods 22 are rigidly secured in one end of the cylinder, extending through the plate 17 so that the plate and the parts carried thereby may slide freely thereon.

Each of the plates 17 and 18' support a central boss 23 and in these bosses are slidably arranged the electrode supports 24 and 25. The electrode support 24 carries the hollow electrode 26 and at the outer end is provided with a hand lever and link 27 to enable the electrode being moved longitudinally. A lock arm 28 is arranged in the boss to hold the electrode.

The electrode support 25 is a rod sliding in the supporting boss and having a block 29 secured thereon. This block is engaged by a cam 30 which draws the electrode out a predetermined distance at the desired period. The cam 30 is mounted on a spindle 31 carried in a bracket 32 secured to the insulator plate 18' and on the other end of the spindle is secured the spur wheel 33 which meshes with a spur wheel 34 rigidly secured to the journal 3 of the bracket 1. The fixed wheel 34 is electrically connected to the feed wire 35 of an electric current supply.

A gear ring 36 is supported by and insulated from the wheel 34 and is connected with the feed wire 37.

A bracket 38 secured to the boss supporting the hollow electrode is provided with a stud on which is mounted the gear 39 meshing with the ring 36. A direct electric contact is made with the latter electrode through the ring and gear and bracket.

A switch arm 40 is rotatably mounted on the boss supporting the hollow electrode. This switch is adapted to engage the bracket carrying the gear 33 to close the electric circuit. The arm 40 is operated by a link 41 connected to a crank arm 42 arranged on a rod 43 supported in a rigid bearing 44 from the cylinder. An arm 45 secured on the rod 43 engages an insulated stop on the rods 46 secured in the electrode supporting boss and holds the end plate 17 in contact with the cylinder.

Figure 1:
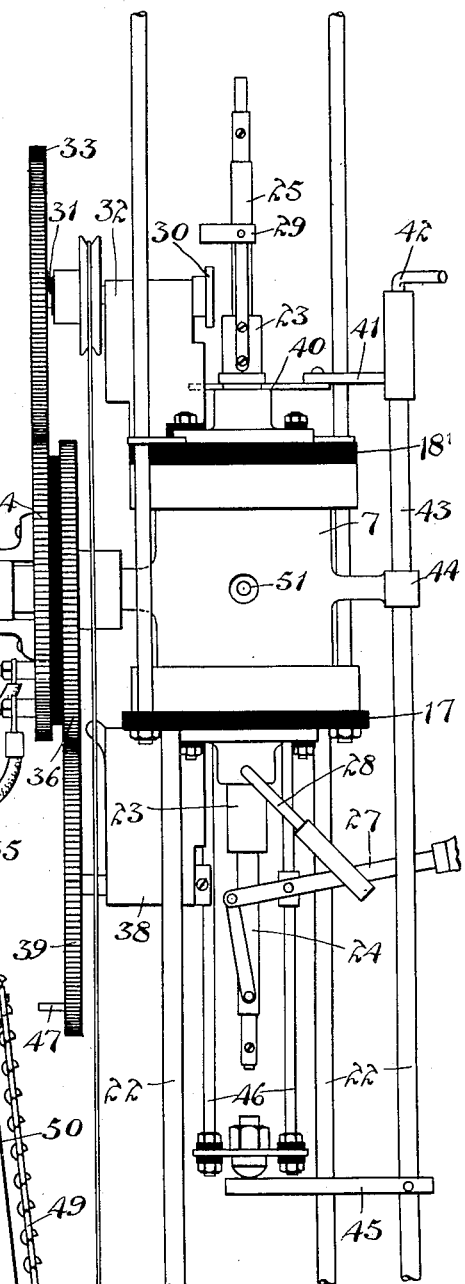

The gear 39 is provided with a pin 47 which when the device swings to the position shown in Figure 1 is in alignment with a series of pins 48 carried by a chain belt 49. The chain belt 49 is carried on a pivotal arm 50 and is constantly rotated and when the pivotal arm is swung out one of the pins 48 will engage the pin 47 on the gear and pull downwardly thereon sliding the loose head of the cylinder downwardly on the guide rods 22 and drawing the end plate and attached disc 9 out of the cylinder.

In carrying this method into effect by the apparatus herein described, the cylinder is turned to the horizontal position illustrated in Figures 3 and 4 and the crank arm 42 is operated to swing the member 45 to lock the movable head in its innermost position. The chamber between the discs 9 is then filled through the charging hole 51, with the silica sand and the hole is closed.

Figure 5:
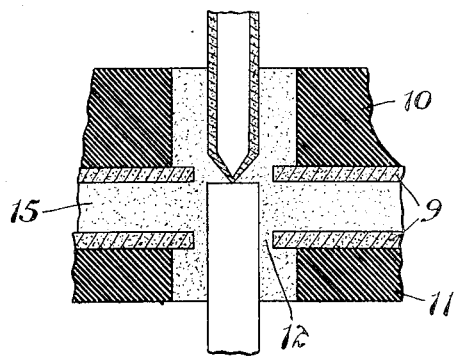
Figure 5 is a diagrammatic section of a portion of the fusing chamber showing the electrodes in position ready to be operated.

The apparatus is then swung to an upright position, the reverse to that shown in Figure 1, the hollow electrode being uppermost as in the diagram Figure 5. The electric current is then turned on to flow to the electrodes.

It will be noted that the hollow electrode is formed with a cone point which prevents the sand flowing into the electrode and also assists in starting the arc.

Figure 6:
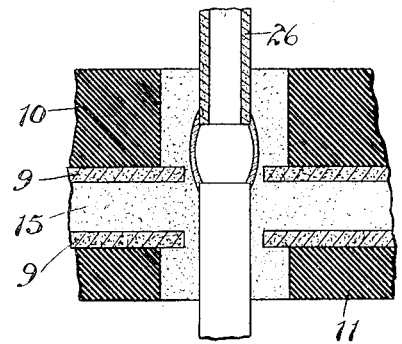
Figure 6 is a section similar to Figure 5 showing the electrodes separated and the embryo tube formed.

The electric arc produces an intense heat which melts the silica sand about the ends of the electrodes and after a brief period in the flow of the current the lever 27 is operated to draw the hollow electrode out a short distance, as illustrated in Figure 6. This action draws the molten silica into a hollow globular shape through the opening in the disc 9. Any gases forming will escape through the hollow electrode.

Figure 7:
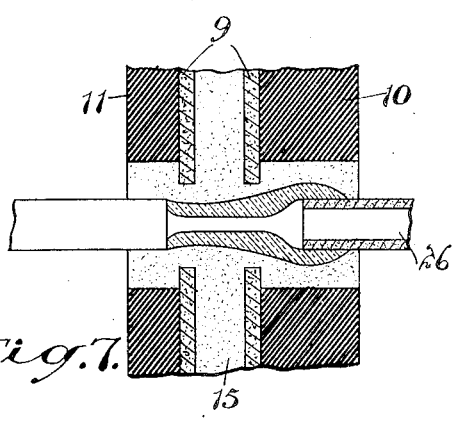
Figure 7 is a section similar to Figures 5 and 6 showing the relative positions of the electrodes and fusing chamber in the further development of the tube.
Figure 9:
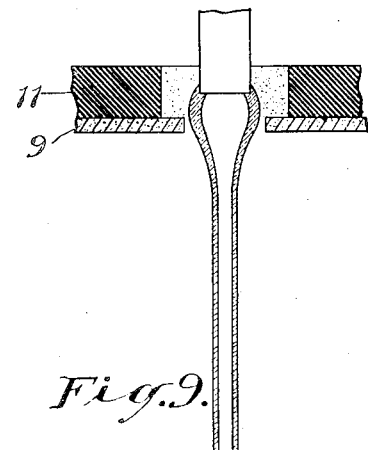
Figure 9 is a diagrammatic section illustrating the drawing of the tube.
Figure 8:
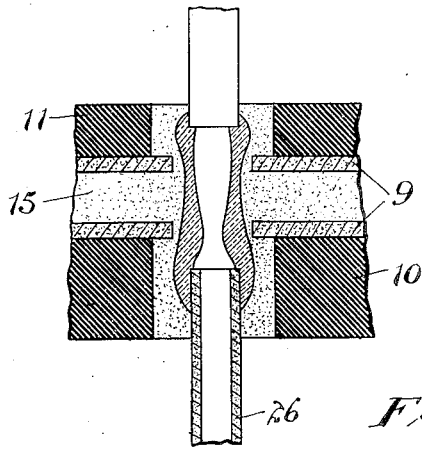
Figure 8 is a section similar to the Figures 5 and 6 with the electrodes in the reversed position and the tube blank ready for drawing.

The worm gear is then put in operation and the cylinder is gradually turned endwise and as the gears carried by the cylinders rotate around the fixed gear, the cam 30 engages the block 29 secured to the solid electrode support and draws the electrode through the opening in the other disc 9. This action elongates the arc and stretches out the molten material as illustrated in Figures 7 and 8. The molten material forms in globular shape around the ends of both electrodes and as these globular formations occur outside of the discs 9 the tube is locked to the discs.

The action of overturning the cylinder is slow and the electric arc melts the main mass of the silica sand but the turning action prevents it from running as the position is shifted.

When the cylinder is completely inverted the operator by means of the rod 43 concurrently throws out the switch 40 and the stop arm 45 holding the loose head in the cylinder and he then by suitable means swings the pivotal arm carrying the chain belt so that one of the pins of said chain will engage the pin on the gear and upon thus engaging the cylinder head and disc 9 connected therewith is drawn downwardly at the desired speed to draw the molten tubular billet out into long tube length. The tube thus drawn will be of uniform thickness and diameter.

The dimensions of the apparatus may be designed to produce whatever diameter of tubes that may be desired and the speed of movement will regulate both the diameter and thickness.

The drawings illustrate a machine which has been operated to produce tubes by the method described but the construction of the apparatus may be altered in many particulars and may be made to operate automatically in all respects without departing from the spirit of the invention.

What I claim as my invention is:—

1. A method of manufacturing hollow ware from refractory mineral substances, consisting in first fusing a quantity of the substances into a tubular billett with an electric arc, then extinguishing the arc and then drawing the fused material into an elongated tubular form.

2. A method of manufacturing hollow ware from refractory mineral substances, consisting in introducing a pair of electrodes through opposing orifices in partitions arranged in a chamber containing the material to be fused and passing an electric current through the electrodes to form an electric arc, then withdrawing said electrodes from the central portion of said chamber through said partitions and forming the melting material into tubular shape, then separating said partitions and engaging and drawing the tubular blank to form an elongated tubular structure.

3. A method of manufacturing hollow ware from refractory mineral substances, consisting in introducing a pair of electrodes through opposing orifices in partitions arranged in a chamber containing the material to be fused and passing an electric current through the electrodes to form an electric arc, then withdrawing said electrodes from the central portion of said chamber through said partitions and forming the melting material into tubular shape with globular ends larger than the orifices in the partitions formed outside of said partitions.

4. A method of manufacturing hollow ware, consisting in introducing a solid electrode and a hollow electrode into the opposite ends of a seated fusing chamber containing the material to be formed, then passing an electric current between the electrodes to fuse the material surrounding same, and conducting the gases away from the arc through said hollow electrode, then moving the electrodes apart through restricted orifices in the end walls of the chamber, then overturning the apparatus to cause the molten material to form around the electrodes in globular form, then separating the end walls of the chamber to cause the fused tubular material to be drawn into elongated form.

5. An apparatus for manufacture of hollow ware, comprising a cylinder, a pair of moveable members within said cylinder forming a central fusing chamber and having central orifices therethrough, electrodes supported axially of the cylinder and moveable longitudinally, means for conducting an electric current to said electrodes, means for operating the cylinder to turn it endwise during the fusing of the material, and means for drawing the ends of the cylinder apart to draw the molten material into elongated tubular form.

6. In an apparatus for the manufacture of hollow ware from refractory mineral substances, a cylinder rotatably mounted transverse of its axis, a head fixed in one end of said cylinder, a moveable head arranged in the other end of said cylinder, extensions from said heads forming a central fusing chamber within the cylinder, electrodes axially arranged in said heads and extending into the fusing chamber, means for moving one of said electrodes longitudinally to draw them apart, means for rotating the cylinder endwise, means actuated by said endwise operating means for moving the other electrode longitudinally, rotatable means for conducting the electric current to the electrodes, and means for moving the adjustable head of the cylinder to draw the molten material into elongated tubular form.

7. An apparatus, comprising a cylinder having a laterally journalled support to enable it to be turned endwise, guides extending from one end of the cylinder, a head slidably mounted on said guides and extending into the cylinder, an electrode holder slidably mounted in said head, a head fixed to the other end of the cylinder having an inward extension which with the extension of the moveable head forms a central chamber, an electrode holder slidably arranged in the fixed head, electrodes carried by said holders, a bracket supported on the fixed head, a spindle mounted in said bracket, a cam on said spindle adapted to engage and move the electrode holder outwardly, a spur gear mounted on said spindle, a spur gear fixed on the journalled support of the cylinder meshing with the aforesaid spur gear, an electrical contact connected with said spur gear, a gear ring insulated from the aforesaid spur gear and rigidly secured, an electrical contact connected with said gear ring, a bracket mounted on the moveable head, a gear journalled on said bracket meshing with said gear ring, means for rotating the cylinder on its transverse journal, and means for withdrawing the moveable head from the cylinder.

8. An apparatus for the manufacture of hollow ware, comprising a cylinder mounted to be rotated endwise having a centrally arranged annular flange in the interior and a charging orifice extending through said flange, a pair of graphite discs adapted to engage the outward faces of said flange and having central openings, insulating rings secured to said graphite discs having central openings larger than the openings through the discs, plates closing the outer ends of said rings, heads closing the ends of the cylinder, spacing members supporting said rings and discs from said heads, hollow electrode holders slidably supported in said heads, a hollow electrode secured to one of said supports, a solid electrode secured to the other of said supports, means for sliding said supports in said heads, means for rotating said cylinder endwise, means for conducting the electrical current to said electrodes through the rotation of the cylinder, and means for moving the moveable head away from said cylinder to draw the fused material outwardly into a tube.

9. An apparatus for the manufacture of hollow ware, comprising a chamber adapted to contain a supply of comminuted fusible material, said chamber having perforated discs of non-fusible material arranged intermediate of its length, a longitudinal guide extending from one end to end of said chamber, a member slidable on said guide and supporting a member forming the moveable end of said chamber, electrodes extending into said chamber through the perforated discs, means for passing an electric current through said electrodes, means for drawing the electrodes outwardly beyond the perforated discs to form a fused blank, means for turning the chamber endwise during the formation of the blank, and means for operating the moveable member on its guide to draw the blank into an elongated tubular form.

CYRIL C. SCHNUR.